Jan. 10, 1967   M. L. AVIGNON ETAL   3,298,017
NON-LINEAR DECODER
Filed Jan. 29, 1964   10 Sheets-Sheet 3
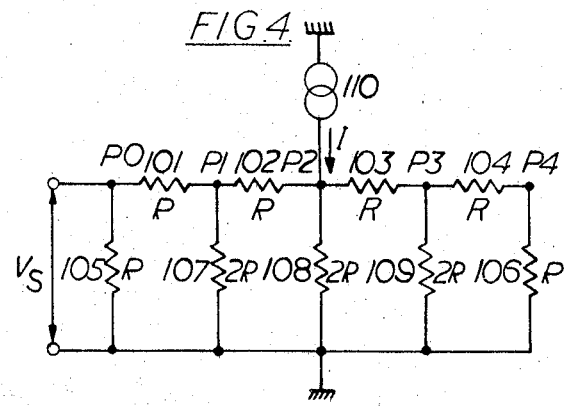
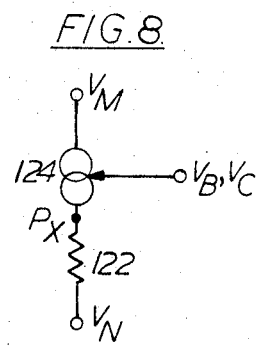
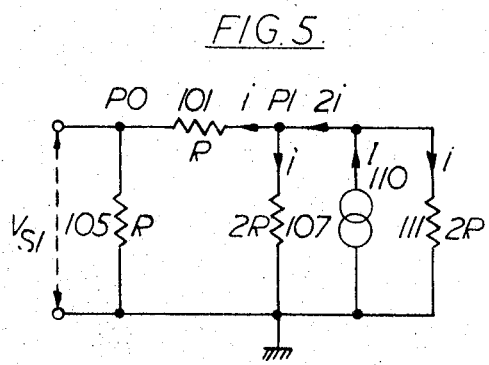
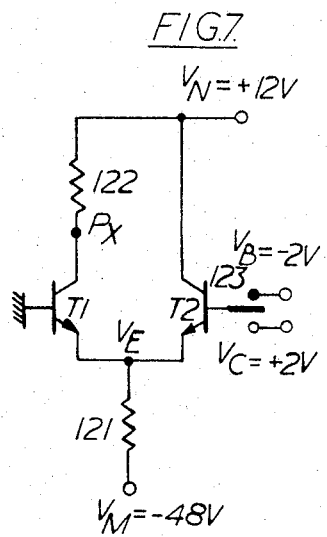
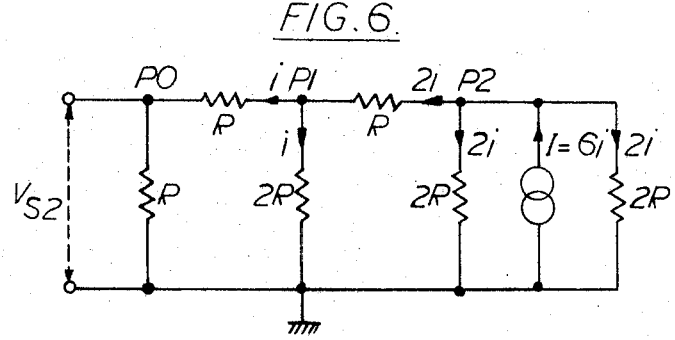
Inventors
MICHEL L. AVIGNON
ALAIN Y. LeMAOUT
By Philip M. Bolton
Attorney Inventors
MICHEL L. AVIGNON
ALAIN Y. Le MAOUT
By Philip M. Bolton
Attorney Jan. 10, 1967   M. L. AVIGNON ETAL   3,298,017
NON-LINEAR DECODER
Filed Jan. 29, 1964   10 Sheets-Sheet 5

| FIG. 13. | FIG. 12A. | FIG. 12B. |

Inventors
MICHEL L. AVIGNON
ALAIN Y. LeMAOUT
By *Philip M. Belton*
Attorney

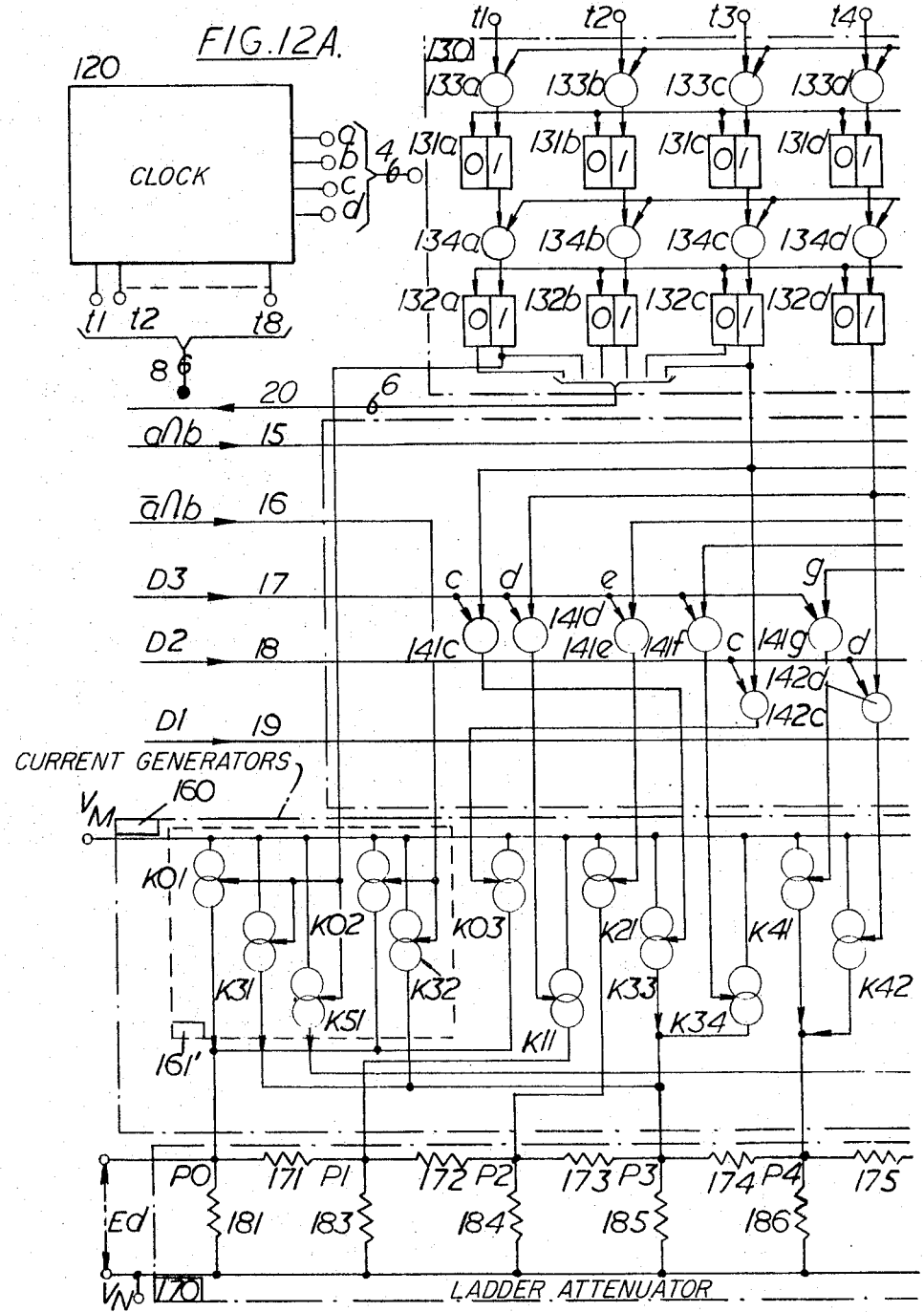

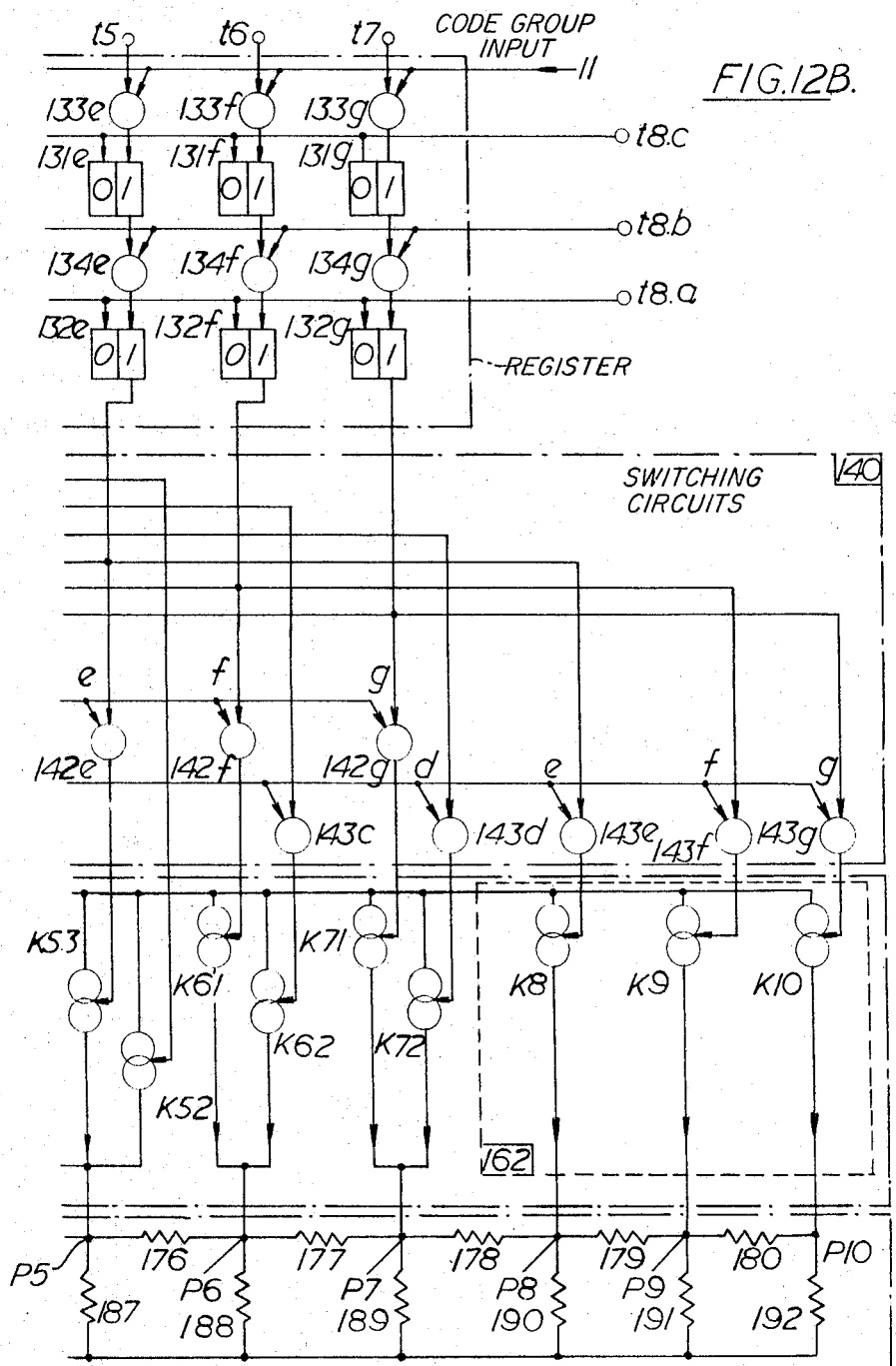

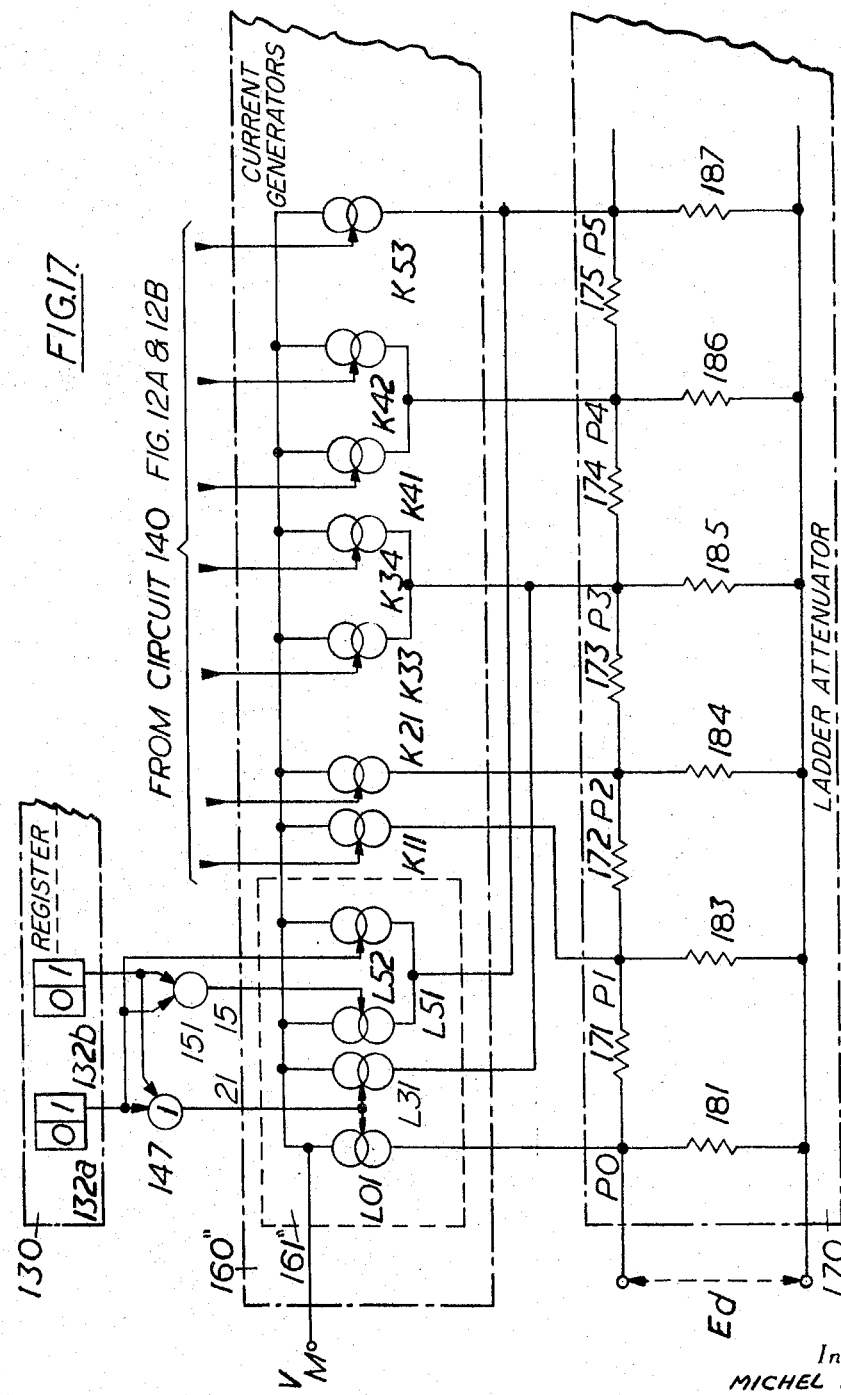

3,298,017
NON-LINEAR DECODER

Michel Louis Avignon, Neuilly, and Alain Yves Le Maout, Mont-Mesly-Creteil, France, assignors to International Standard Electric Corporation, New York, N.Y., a corporation of Delaware
Filed Jan. 29, 1964, Ser. No. 341,035
Claims priority, application France, Feb. 4, 1963, 923,632, Patent 1,357,668
9 Claims. (Cl. 340—347)

The present invention concerns a device for decoding a binary number into an analog signal the amplitude of which is not proportional to the value of the number.

A nonlinear feedback coder using said decoder may be achieved, said devices being used in pulse code modulation (PCM) systems.

Such circuits are more specially used in PCM transmission systems in order to achieve the operations known as "compression" and "expansion."

The mechanism of the improvement brought by said operations in the various transmission systems has been studied by Bernard Smith in the May 1957 issue of the Bell System Technical Journal, in the article entitled "Instantaneous Compounding of Quantized Signals," which will be further referenced by $(a)$.

In a transmission system, the variable to be coded is a voltage of maximum amplitude $\pm(Ec/2)$. If $v$ designates the amplitude of a quantitizing step and $n$ the number of digits of the number, the range of voltages included between 0 and $Ec$ (if the origin of the voltages is submitted to a translation of amplitude $-(Ec/2)$) is divided into $2^n$ equal quantizing steps $1, 2, 3 \ldots i \ldots 2^n$. The quantization consists in assigning the same binary number to all the signals the instantaneous amplitude of which $e_i$ lies within the limits of the $i$th interval. In the particular case of PCM, it is known that the quality of the transmission decreases when the level of the voltage to be coded decreases since, in the case of the linear coding just described, the number of quantizing steps actually used is smaller. The subject has been discussed by W. R. Bennet in the July 1948 issue of the Bell System Technical Journal, the article entitled "Spectra of Quantized Signals." It appears from that study that compression in PCM brings a considerable reduction of the quantization noise for weak signals and only a slight deterioration for strong ones. In fact, this noise presents small importance: if one considers a signal to be coded having an amplitude $V_{eff}$ and presenting a constant spectrum density in the voice frequency band, its peak voltage is approximately 9 db higher than $V_{eff}$ and the probability for the signal to reach this peak value is very low (approximately 1/1000), i.e., strong signals are coded much more seldom than medium amplitude or weak signals.

Advantage is taken of this property by choosing quantization steps which are narrower when the amplitude of the signal to be coded decreases thus obtaining a considerable total reduction of the quantization noise. Thus, in the article referenced $(a)$, the author studies a logarithmic compression characteristic which may be defined as the curve obtained when the ratio between the amplitude of the voltage to be coded and the amplitude of the quantizing step corresponding to this voltage is constant.

It will be noted that it is difficult to design circuits to obtain a logarithmic compression curve which is accurate and stable.

More generally, it is known that it is very difficult to achieve nonlinear circuits which are perfectly complementary although located in distinct geographic positions. This is the case, for instance, in a telephone network operating, at least partially, in PCM and wherein the coder and decoder are located at a certain distance one from the other.

In order to obtain an optimum transmission characteristic, it is necessary that a coder-compressor should operate with any decoder-expander, this condition excluding the use of nonlinear elements such as diodes or varistors.

The basic circuit of the PCM compressor-expander according to the invention is a nonlinear decoder comprising only linear circuit elements, which is used, either as a decoder-expander, or as a decoder associated with a coder-compressor of the feedback type.

It should be recalled that feedback coding consists in comparing the analog value of a number stored in a register to the signal to be coded and in determining whether the number is too high or too small. In the first case, the value of the number is reduced, and in the second case, it is increased. These comparison operations are carried on up to the time where the compared voltages differ, at most, of the value by a quantization step.

When the coder used is a nonlinear one, the coding is carried out according to a nonlinear characteristic curve. Since the same decoder may be used both for coding and for decoding, the compression and expansion characteristics are then perfectly complementary if said decoder presents stable and reproducible characteristics.

Nonlinear decoders using a resistance network to obtain a hyperbolic characteristic are known. These resistances, the extreme values of which are in the ratio of $2^n$ must be switched according to the value of the number to be decoded.

But, it is known that a resistance presents a certain reactance which is a function of its value. If the switching frequency is high, the effect of this reactance becomes important and the value of the corresponding complex impedance depends upon the number to be decoded. One realizes thus that a decoder comprising resistances, the values of which are so different, are difficult to design and could not present a high accuracy.

Besides, when an electronic switch is used, this latter presents, when it is conductive, a series resistance (saturation resistance in the case of a transistor) which is not negligible with respect to the low value resistances of the network. This introduces a new source of errors.

Last, in some decoders of this type, the hyperbolic characteristic is obtained by inserting an operational amplifier in a feedback loop. This introduces an additional element of inaccuracy.

In order to obviate the difficulties in obtaining a continuous nonlinear characteristic, either logarithmic or hyperbolic, the decoder according to the invention has been designed in such a way that its characteristic is made up of a sequence of segments of lines of different slopes, these slopes being chosen in such a way, for instance, to be approximately tangent to one of the logarithmic curves of the family of curves shown on FIGURE 3 of the article referenced $(a)$.

If the number of segments of lines is sufficiently high and if cautions are taken in order to avoid audible distortions at the connection points, one understands that the quantization noise in a coding-decoding chain using such a decoder at the input and at the output, should only be slightly different from the theoretical values obtained with a device having a continuous characteristic.

It will be noted that different slopes may be selected in order that they should be tangent to different curves at low levels and high levels, these curves being themselves selected in order to obtain a total improvement of the quantization noise factor.

The object of the present invention is to achieve a nonlinear digital to analog decoder having stable and reproducible characteristics.

Another object of the present invention is to realize a nonlinear feedback coder utilizing such a nonlinear decoder.

The invention will be particularly described with reference to the accompanying drawings in which:

FIGURE 4 shows the detailed diagram of a ladder attenuator;

FIGURE 5 shows the equivalent network of the attenuator when a current generator is connected to point P1;

FIGURE 6 shows the equivalent network of the attenuator when a current generator is connected to point P2;

FIGURE 7 shows the detailed diagram of a constant current generator;

FIGURE 8 shows, symbolically, a current generator according to FIGURE 7;

FIGURES 12A and 12B show the detailed diagram of the nonlinear decoder;

FIGURE 17 shows a second alternative solution of the nonlinear decoder.

Figure 13:
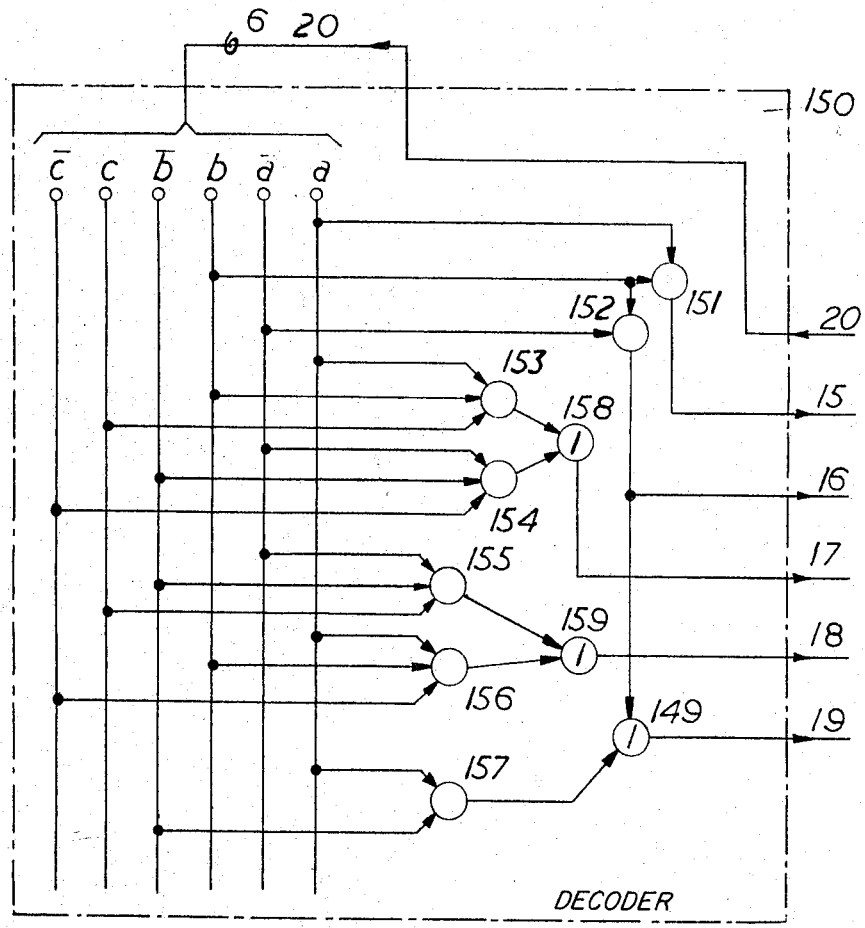
FIGURE 13 shows the detailed diagram of the decoder 150.

Before describing the invention, the logical algebra notations which will be used herein in order to simplify the writing in the description of logical operations will be briefly discussed. The subject is discussed extensively in numerous papers, and in particular, in the book "Logical Design of Digital Computers," by M. Phister (J. Wiley, editor).

Thus, if A designates a condition characterized by the the presence of a signal, $\overline{A}$ will designate the condition characterized by the absence of the said signal.

These two conditions are connected together by the well known logical relation $A \cap \overline{A} = 0$ in which the sign $\cap$ symbolizes the coincidence logical function or "AND" function.

If a condition C appears only if conditions A and B are present simultaneously, one writes $A \cap B = C$ and this function is achieved through a coincidence gate or "AND circuit."

If a condition C appears when at least one of the two conditions E and F is present, one writes $E \cup F = C$ and this function is achieved through a mixing gate or "OR circuit."

Since the AND and OR logical functions are commutative, associative and distributive, one may write $$A \cup B = B \cup A;\ A \cap (B \cup C) = (A \cap B) \cup (A \cap C);$$
$$(A \cup B) \cap (C \cup D) = (A \cap C) \cup (A \cap D) \cup (B \cap C) \cup (B \cap D);$$

etc.

The meaning of the symbols used in the drawings of the present invention will also be defined.

Figure 1:
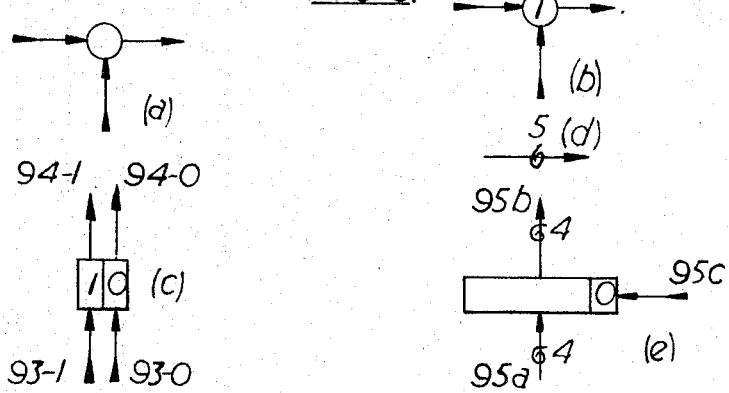
FIGURE 1 shows the different symbols used in the drawings of the present invention.

FIGURE 1 shows the different particular symbols used;

FIGURE 1(a) shows a simple AND circuit.

An input of an AND circuit will be said to be energized when a signal is applied on said input and that the AND circuit is activated if all its inputs are simultaneously activated.

FIGURE 1(b) shows an OR circuit;

FIGURE 1(c) shows a flip-flop or bistable circuit to which a control signal is applied on one of its inputs 93-1 or 93-0 in order to set it respectively to the 1 state or to the 0 state. A voltage of same polarity as the control signal is present on the output 94-1 when the flip-flop is in the 1 state and on the output 94-0 when it is in the 0 state. If the flip-flop is referenced B1, the logical condition characterizing the fact that it is in the 1 state will be written B1, that characterizing the fact that it is in the 0 state will be written $\overline{B1}$;

FIGURE 1(d) shows a group of several conductors, five in the considered example;

FIGURE 1(e) shows a register which comprises four flip-flops, the input terminals of which are connected by the conductors of the group 95a and the outputs 1 of which are connected to the group of conductors 95b. The digit 0 placed at one of the ends of the register means that this latter is cleared when a signal is applied to the conductor 95c.

The principle of feedback linear coders and of the decoding in such coders will be first discussed, said circuits being described in the book of A. K. Susskind, entitled "Notes on Analog-Digital Conversion Techniques" (MIT publication), chapter V, paragraph E. This book will be further on referenced (b).

Figure 2:
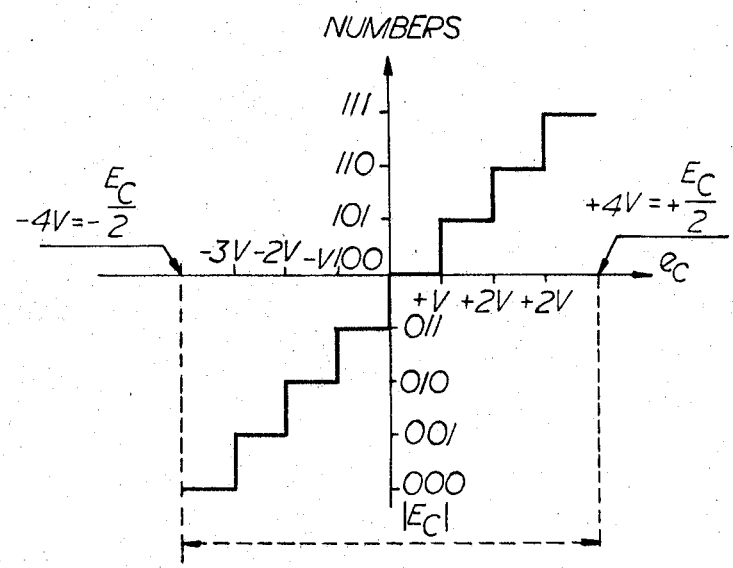
FIGURE 2 shows the characteristic curve of a linear coder.

FIGURE 2 represents the characteristic curve of a linear coder with the voltages to be coded in abscissae and the corresponding numbers in ordinates.

A curve symmetrical with respect to the origin of co-ordinates has been shown so that the considered coder enables the coding of periodical voltages of maximum amplitude $\pm(Ec/2)$. In order to simplify the figure, it will be assumed that the codes obtained are three digit binary numbers. Each one of the voltage ranges between $-(Ec/2)$ and 0, and between 0 and $+(Ec/2)$ is thus divided into four equal quantizing steps of amplitude $v$, and it is seen, for instance, that a positive voltage of amplitude $e$ between $v$ and $2v$ is represented by the number 101.

As a general rule, if $n$ is the number of digits of the code, one has:

$$|Ec| = 2^n v \text{ and } |Ec|/v = 2^n \tag{1}$$

The Equation 1 gives the number of quantizing steps in the range $\pm(Ec/2)$.

Figure 3:
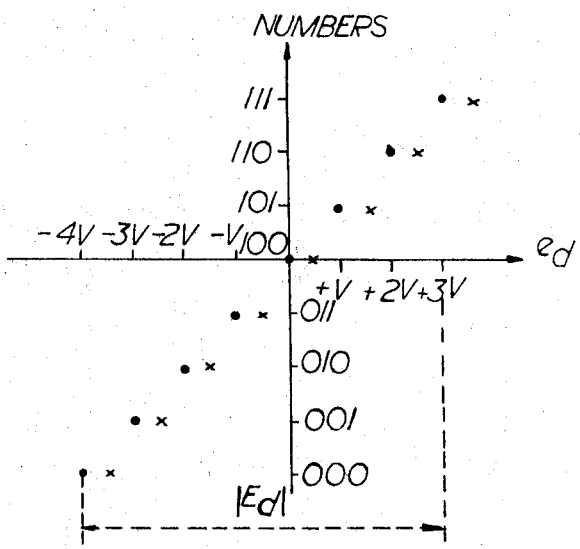
FIGURE 3 shows the characteristic curve of a linear decoder.

FIGURE 3 represents the characteristic of a linear decoder materialized by a sequence of points, said decoder being designed for cooperating with the coder of FIGURE 2. Thus the number 101 is represented by the voltage $+v$, the number 110 by the voltage $+2v$ and the number 111 by the voltage $+3v$. This decoder delivers voltages ranging between $-4v$ and $+3v$ and one may write, more generally: $|Ed| = (2^n - 1)v$.

It is thus seen that the maximum voltage $Ed$ delivered by this decoder is lower by the value of one quantizing step than the maximum voltage $|Ec|$ that is applied to the coder.

Table I, in which the voltage to be coded $ec$ and the voltage to be decoded $ed$ have been respectively referenced, shows that the described decoder delivers, for a given number, a voltage $ed$ equal to the lower limit of the voltage $ec$.

If, as it has been shown on FIGURES 2 and 3, the lower limit of the voltage $eC$ corresponding to the number 000 and the value of the voltage $ed$ corresponding to the same number are equal, the difference between $|Ec|$ and $|Ed|$ is equal to the difference of the maximum and the minimum values of the voltage $ec$ corresponding to the number 111.

It will be noted that, for a given number, the maximum difference between $ec$ and $ed$ may be reduced to the value of half a quantizing step by increasing all the decoded voltages by $+(v/2)$, this being indicated on the figure by the characteristic represented by crosses.

Nevertheless, when the decoder is used in a feedback coder in which there is produced, according to a certain order, a sequence of $n$ numbers the decoded value of which is compared to the voltage to be coded, this difference presents no inconvenience at all.

TABLE I

| Number | Ec | | Ed, v. |
|---|---|---|---|
| | Minimum, v. | Maximum, v. | |
| 000 | −4 | −3 | −4 |
| 001 | −3 | −2 | −3 |
| . | | | |
| . | | | |
| 110 | +2 | +3 | +2 |
| 111 | +3 | +4 | +3 |

Let us consider, for instance, the coding of a voltage $ec$ ranging between $+v$ and $+2v$.

The first operation consists in comparing this voltage with the voltage $ed$ corresponding to the number 100. In this case, $ec-ed>0$ and the most significant digit of the number is 1. The next operation consists in comparing $ec$ with the voltage $ed$ corresponding to the number 110. In this case, $ec-ed<0$ and the next less significant digit is 0. The last operation consists in comparing $ec$ with the voltage $ed=+v$ corresponding to the number 101.

The difference $ec-ed$ thus ranges between 0 and $+v$ and it is deduced that the less significant digit is 1.

As a general rule, if M$s$ designates the digit of rank $s$, one has:

$$\text{for: } ec-ed \geqslant 0 \quad Ms=1$$
$$\text{and for: } ec-ed < 0 \quad Ms=0$$

It is thus seen that this coding formula uses the difference existing between the voltages $|Ec|$ and $|Ed|$.

The principle of operation of a decoder presenting the characteristic of FIGURE 3 and which is described in chapter V, paragraph D1 of the book referenced (b) will now be discussed.

FIGURE 4 represents the ladder attenuator used in this decoder and comprises, by way of a nonlimitative example, four resistors 101 to 104 connected in series which define five "input points" P0 to P4 and five resistors 105 to 109 connected in parallel between each one of the input points and the ground.

The resistors 101 to 106 have a value R and the resistors 107 to 109 have a value 2R.

A generator 110 which delivers a constant current of amplitude I is connected to one of the input points, the point P2, for instance.

It is seen that the impedance of the part of the attenuator which is to the right of point P2 and of the resistor 108 is equal to 2R and that this right hand part may be replaced by one single resistor having this value.

In the same way the impedance of the part of the attenuator which is to the left of point P2 and of the resistor 108 is equal to 2R so that the impedance seen by the source 110 is equal to 2R/3. This impedance is the same regardless of the current injection point P1, P2, P3 or P4. When the current is injected in P0, a resistor of value 2R (right hand side of the attenuator) is in parallel with resistor 105 of value R so that the impedance seen by the source 110 is again equal to 2R/3.

FIGURE 5 represents the diagram equivalent to the attenuator when the generator 110 is connected to the input point P1. The resistors 101 and 105 are in series and are connected in parallel with resistor 107 so that, if $i$ designates the current which flows through the resistor 111, representing the impedance of the right hand side of the attenuator, a current $i$ flows also through the resistor 105. One has $I=3i$; $Vs1=Ri=RI/3$, $Vs1$ being the output voltage collected between the point P0 and the ground.

FIGURE 6 represents the equivalent network when the generator 110 is connected to the input point P2. It is seen that $I=6i$ and $Vs2=RI/6$.

It is thus seen that, when the injection point of the current I moves to the right from P0 to P1, from P1 to P2, etc. the voltage between the output terminals decreases each time by half.

Generally, if the attenuator comprises $X+1$ incoming points P0, P1, P2 ... P$x$ ... PX, the output voltage V$x$ obtained by the injection of a current I at the point P$x$ is:

$$Vx=(2RI/3)\times(1/2^x)=Vso\times 2^{-x} \qquad (2)$$

with $Vso=2RI/3$.

If several identical generators are connected to several different input points, the output voltage is, according to the superposition theorem, equal to the sum of the voltages due to each one of the generators considered separately. The same thing happens when several generators are connected in parallel to the same input point.

This ladder attenuator may be used in a linear decoder in which a digit of given rank is assigned to each input point, the point P0 being assigned to the most significant digit, the point P1 to the next less significant digit, etc. Such a circuit will be described in relation with FIGURE 9.

FIGURE 7 represents a constant current generator equipped, by way of a nonlimitative example, with NPN transistors.

It comprises two transistors T1 and T2 having their emitters connected in common to a negative potential $VM=-48$ volts through a resistor 121. The collector of the transistor T1 is connected to the input point P$x$ of the attenuator and it is thus loaded by a resistor 122 of value 2R/3 which is connected to a positive potential $VN=+12$ volts. Its base is at the ground potential.

The collector of the transistor T2 is connected directly to the potential VN and its base can receive one of the voltages VB or VC, the switching of these voltages being symbolically represented by the switch 123.

A resistor 121 of high value and a high gain transistor T1($h_{fe}>50$) have been chosen. In these conditions:

(a) The collector current depends only upon VM and upon the value of the resistor 121;
(b) The transistor cannot be saturated when it is conducting, so that it presents a low output admittance, slightly different from the output admittance $h_{oe}$ of the transistor.

In order to describe the operation of this circuit, one will first assume that the switch 123 is thrown in the low position so that a voltage $VC=+2v$ is applied to the base of the transistor T2 which becomes conducting. The voltage VE on the emitters of the two transistors is slightly more negative than VC, i.e., $VE=VC-u$ volts, $u$ representing the voltage drop in the base-emitter junction. Since, generally, $u \leqslant 0.6$ volt, VE is a positive voltage with respect to the ground.

Since the base of the transistor T1 is at the ground potential, it is then more negative than its emitter and this transistor is blocked so that the difference of potential across the terminals of the resistor 122 is zero.

If now the switch 123 is thrown in the high position and if $VB=-2$ volts, the voltage VE becomes more negative and tends towards $VB=-u$. The transistor T1 becomes conducting and $VE=-u$ so that the transistor T2 is blocked.

A current $I_1 \cong (VM-u)/R'$ flows through the resistor 121.

When the transistor T2 is conducting, the current $I_2$ which flows through the resistor 121 is:

$$I_2=(VM+(VC-u))/R'$$

By replacing V$m$, VC and $u$ by their values, one has: $I_1=47.5/R1$; $I_2=45.5/R1$; $I_2/I_1 \cong 0.96$.

Since this ratio is very close to 1, the current which flows through the resistor 121 is almost constant. Therefore, there appears no appreciable transient signal during switching and the value of resistor 121 can be as high as desired.

So, the voltage at the point Px is +12 v. when the generator is blocked and it becomes more negative when it is unblocked, the value of this voltage depending upon the values of the resistors 121 and 122.

FIGURE 8 is a symbolic representation of the constant current generator just described. The figure constituted by the two secant circles referenced 124 represents this generator which, when activated by a signal VB or VC, establishes a current flow between the sources of potential VM and VN. The resistor 121 as well as the derivation of the current by the transistor T2 of FIGURE 7 have not been represented.

Figure 9:
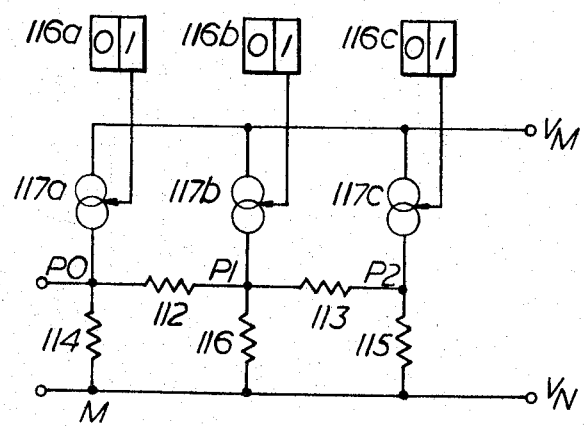
FIGURE 9 shows the detailed diagram of a linear decoder.

FIGURE 9 represents the diagram of a linear decoder using the ladder attenuator, described in relation with FIGURES 4, 5 and 6 and of the current generators described in relation with FIGURES 7 and 8. The resistors 112–115 have a value R, the resistor 116 a value 2R and each one of the current generators 117a to 117c delivers a current of amplitude I when the control flip-flop 116a, 116b, 166c to which it is connected is in the 1 state.

According to the Equation 2 the following voltages appear between the terminals P0 and M:

$Vx_0 = Vso$ when the flip-flop 116a is alone in the 1 state;
$Vx_1 = Vso \times 2^{-1}$ when the flip-flop 116b is alone in the 1 state;
$Vx_2 = Vso \times 2^{-2}$ when the flip-flop 116c is alone in the 1 state;

and the following algebraic equation may be written:

$$ed = Vso(a2^0 + b2^{-1} + c2^{-2}) \quad (3)$$

In this equation the parameters $a$, $b$, $c$, have the value 1 when the flip-flop bearing the same index is in the 1 state and the value 0 when it is in the 0 state.

The maximum voltage delivered by the decoder is obtained for $a = b = c = 1$, viz.:

$$Ed = Vso(2^0 + 2^{-1} + 2^{-2}) \quad (4)$$

The principle of operation of the nonlinear decoder, object of the invention will be now described.

One shall consider the natural sequence of the $n$ digit numbers (or "codes") expressed in a radix B number system. These codes may take all the discrete values having decimal equivalents between 0 and $B^n - 1$ (the numbers B and $n$ being expressed in the decimal number system).

The decoding consists in associating with each one of these codes an analog signal, for instance a voltage, varying in a discontinuous way from one code to the adjacent one, the amplitude of said signal between 0 and $Ed$ volts representing the value of the code.

If $ed$ designates this voltage and N the corresponding number, it is said that the decoding is nonlinear if the function $ed = f(N)$ is a nonlinear function, it being well understood that the discontinuity between the values of $ed$ corresponding to a sequence of numbers is not considered as a nonlinearity.

In order to obtain such a nonlinear decoding characteristic, the sequence of codes is divided into S groups referenced $C1, C2 \ldots Cs \ldots CS$ and a particular value of quantizing step $V1, V2 \ldots Vs \ldots VS$ is assigned to each one of these groups.

If $A1, A2 \ldots As \ldots AS$ designate the number of codes in each one of the groups, one has:

$$A1 + A2 + \ldots + AS = B^n \quad (6)$$

The minimum code of the group C2 or code $(C2)min$ is then represented by the voltage $A1 \times V1$; the code $(C3)min$ by the voltage $A1 \times V1 + A2 \times V2$ and the code $B^n - 1$ by the voltage:

$$Ed = A1 \times V1 + A2 \times V2 + \ldots + As \times Vs + \ldots (AS - 1) \times VS \quad (7)$$

Figure 10:
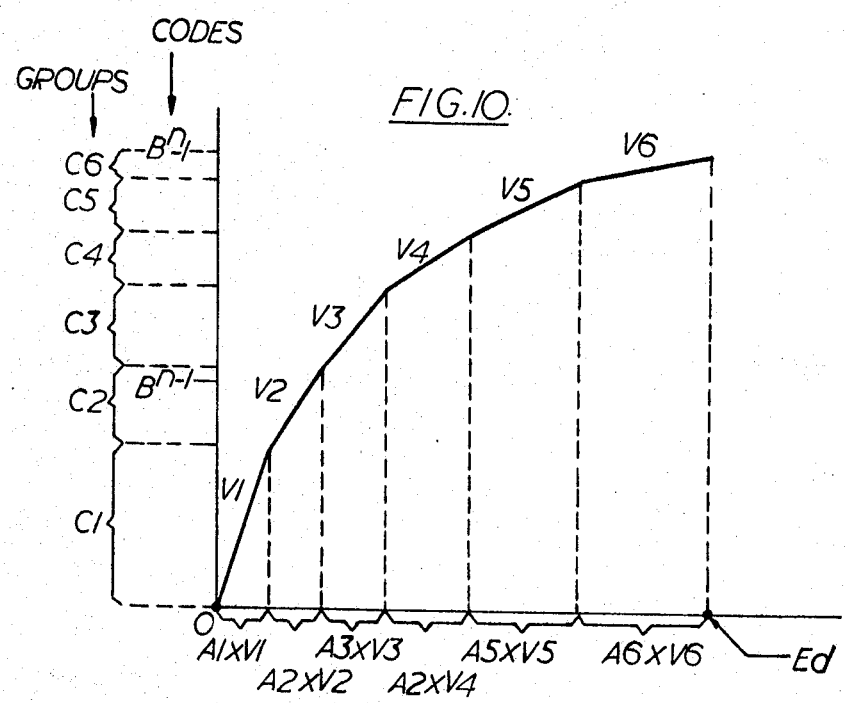
FIGURE 10 shows a nonlinear decoding characteristic curve.

FIGURE 10 represents the broken line characteristic obtained by setting the codes N in ordinates and these decoded voltages $ed$ in abscissae. The slope of a given line, for instance, that corresponding to the group $As$ is equal to the value of the quantizing step in this group, i.e., $Vs$.

The projection of this segment on the voltage axis is equal to $As \times Vs$ and its projection on the number axis defines the group of codes $Cs$.

The Equations 6 and 7 define completely the proposed system and the numbers of codes as well as the values of the quantizing steps may be chosen according to the requirements provided only they satisfy these equations.

In order to obtain the voltage $es$ corresponding to a code $Ns$, one must:

(1) Determine the group $Cs$ to which this code belongs;
(2) Produce a voltage $e's = A1 \times V1 + A2 \times V2 + \ldots A_{(s-1)} \times V_{(s-1)}$;
(3) Determine the position of the code in the group $Cs$ by calculating the difference $Ds = Ns - Cs(min)$;
(4) Produce a voltage $e''s = Ds \times Vs$; one has therefore: $es = e's + e''s$.

When $Ns = B^n - 1$, one has $$Ds = (B^n - 1) - CS(min) = AS - 1$$

and therefore $e''s = (AS - 1) \times VS$ and $e's + e''s = Ed$.

The determination of the group is carried out by means of a decoder comprising S output terminals Z1, Z2 ... Zs ... ZS, a signal appearing on the output $s$ when the code belongs to the group $Cs$.

The computation of the difference number $Ds$ may be carried out in a subtractor but it will be seen further on that, by a suitable selection of the parameters, this number may be obtained in a very simple manner.

The voltages $e's$ and $e''s$ are supplied with two sets of current or voltage generators.

The first one of these sets includes $S-1$ generators $G1, G2 \ldots Gs \ldots G(S-1)$, a generator such as G1 delivering signals of amplitude $A1 \times V1$.

When a code belongs to the group $Cs$, i.e., when a signal appears on the output terminal $Zs$ of the decoder, the generators G1 to $G(s-1)$ are activated, so that a signal is obtained:

$$e's = A1 \times V1 + A2 \times V2 + \ldots A_{(s-1)} \times V_{(s-1)}$$

The second set of generators includes S generators H1, H2 ... HS and, in the case of the example, the generator Hs delivers a signal of amplitude $e''s = DS \times Vs$. The voltages produced by the activated generators are added in a summing network which delivers a voltage $es = e's + e''s$.

If the numbers $A1, A2 \ldots AS$ are chosen as integral powers of B, i.e., if one has $A1 = B^{n-t}$; $A2 = B^{n-u}$; ...; $AS = B^{n-x}$, the determination of the group is obtained by decoding a given number of the most significant digits of the codes, this number being the highest of the numbers $t, u \ldots x$. On the other hand, the difference number in a given group, the group A2 for instance, is given by the $n-u$ less significant digits of the codes.

Besides, if one chooses the quantizing steps V2, V3 ... VS as being equal to the product of integral powers of B by the value of the quantizing step V1 chosen as the unit quantizing step, i.e., if one has:

$$V2 = B^p \times V1, \quad V3 = B^q \times V1 \ldots VS = B^y \times V1$$

then each one of the elementary voltages $e's$ and $e''s$ is the sum of a number of terms in integral powers of B.

The voltage corresponding to each one of these terms may be obtained by injecting a current I into an input point suitably selected along a ladder attenuator, wherein each cell brings an attenuation of B, the position of said point being determined by the exponent of B. An attenuator of this type provided for being used with a number system of radix $B=2$ has been described in relation with FIGURES 4 to 6.

In the most favorable case (when $p, q \ldots y$ are different one from the other) one has: $q=p+1$, etc., and the slopes of two adjacent lines differ from B: for instance $V2/V1=B$.

One may obtain a ratio between adjacent slopes lower than B by choosing a unit quantizing step $Vo$, such as V1, V2 ... VS should be equal to the product of $Vo$ by a sum of terms which are of different powers of B. For instance, in the binary number system, if $$V1=2^2+2^1)Vo=6Vo \text{ and } V2=(2^2+2^1+2^0)Vo=7Vo$$

one has: $(V2/V1)=(7/6)$.

This enables the establishment of a nonlinear decoding characteristic as close as possible to any function, provided that, in this curve, the correspondence between each code and the decoded voltage should be biunivocal.

If one chooses $B=2$, the described device will operate on numbers written in natural binary code. In the present invention, one will describe by way of a nonlimitative example, a nonlinear decoder in which values expressed by integral powers of 2 have been chosen for A1, A2 ... AS and for V1, V2 ... VS.

One has thus:

$$A1=2^{n-t}$$
$$A2=2^{n-u}$$
$$\ldots\ldots$$
$$AS=2^{n-x}$$

and if V1 is the unit quantizing step corresponding to the group C1, one sets:

$$V2=2^pV1$$
$$V3=2^qV1$$
$$\ldots\ldots$$
$$VS=2^yV1$$

With the following relations corresponding respectively to the relations (7) and (6) of the general case:

$$2^{n-t}+2^{n-u}+\ldots 2^{n-x}=2^n$$
$$2^{-t}+2^{-u}+\ldots 2^{-x}=1 \quad (5)$$

and $$(Ed/V1)=2^{n-t}+2^{n-u+p}+\ldots (2^{n-x}-1)\times 2^y \quad (9)$$

As it has been seen previously, the determination of the group to which a given code $Ns$ belongs is carried out by the decoding of a certain number of the most significant digits. Thus, all the numbers belonging to the group C1 are characterized by the fact, that their $t$ most significant digits are the same. If one chooses, for instance, $n=7$ and $t=3$, one has $2^{n-t}=2^4=16$ and the $t=3$ most significant digits of all the codes of this group are identical.

Figure 11:
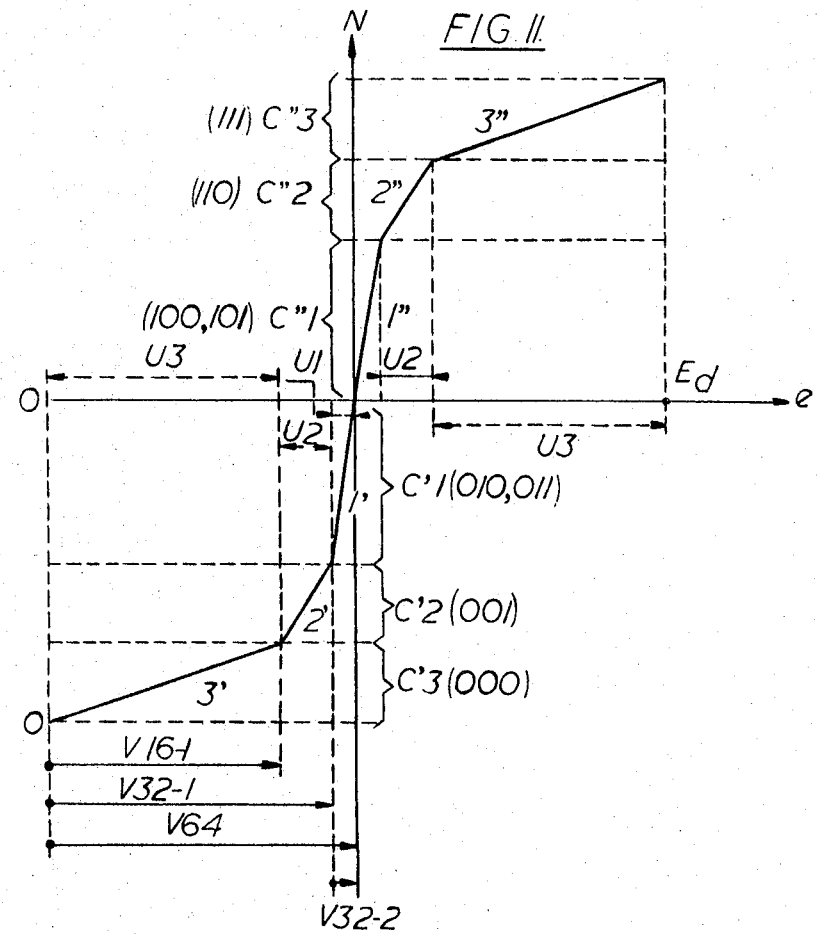
FIGURE 11 shows an expansion characteristic curve.

FIGURE 11 represents the characteristic curve chosen for this nonlinear decoder in which the codes, increasing from 0 to $2^7-1$, are shown on the ordinate and the corresponding decoded voltages are shown on the abscissa, the zero of the voltage coordinates being placed, as it can be seen on the figure, at a half the voltage scale 0 to $Ed$.

This characteristic, which is symmetrical with respect to the zero of the coordinates, occupies the first and the third quadrants. It is more particularly adapted to the decoding of numbers representing periodical voltages. If these voltages are sinusoidal, the decoded voltage $Ed/2$ at the zero of the coordinates represents the mean value of the signal.

In each quadrant, the range of voltages has been divided into three zones U1, U2, U3 to which correspond three groups of numbers $C'1, C'2, C'3$ in the third quadrant, and $C''1, C''2, C''3$ in the first quadrant, so that the characteristic curve made up by the broken lines $3', 2', 1', 1'', 2'', 3''$, is symmetrical with respect to the zero of the coordinates, contrary to the example studied in relation with FIGURE 9.

In the case of sinusoidal signals, the negative alternations are represented by voltages ranging between 0 and $U1+U2+U3$ and the positive alternations by voltages ranging between $U1+U2+U3$ and $Ed$ minus a quantizing step, this latter being the interval which separates in the coding operation the numbers $2^7-1$ and $2^7-2$ (see description of FIGURE 3).

The code numbers in each group have been chosen so that: $A'1+A'2+A'3+A''1+A''2+A''3=2^n=128$.

The distribution in the different groups is as follows:

(a) $A'1=A''1=32$ this corresponding, in each one of these groups, to $2^{n-t}$ codes with $t=2$;

(b) $A'2=A''2=A'3=A''3=16$ this corresponding, in each one of these four groups to $2^{n-u}$ codes with $u=3$.

Since the unit quantizing step is assigned to the groups A'1 and A''1, one has also chosen:

$$V2=2^3V1$$
$$V3=2^6V1$$

As it has been seen on the figure, the $u=3$ most significant digits of the code are utilized for determining the zone to which it belongs and these most significant digits also characterize the quadrant it lies in.

The values of the voltages U1, U2, U3 are given by the following equations:

$$U1=A'1\times V1=2^{7-2}\times V1=2^5\times V1$$
$$U2=A'2\times V2=2^{7-3}\times 2^3\times V1=2^7\times V1$$
$$U3=A'3\times V3=2^{7-3}\times 2^6\times V1=2^{10}\times V1$$

The different digits of the considered code are referenced $a, b, c, d, e, f$ and $g$; $a$ being the most significant digit and $g$ the least significant one.

The logical condition characterizing the fact that the value of the digit $a$, for instance, is 1 will be written $a$, and that characterizing the fact that this digit is 0 will be written $\bar{a}$.

The equation which enables a particular analog voltage to correspond to each one of the codes ranging between 0 and $2^n-1$ will now be established. This equation will correspond to the Equation 3 studied in relation with the FIGURE 9 and which was established for a linear decoder.

Nevertheless, in this last case, the weight assigned to each digit of the code was constant and this enabled the writing of the equations in a simple algebraic form.

For the nonlinear decoder object of the invention it will be seen, by examining the voltages corresponding to each one of the codes, that the weights of the digits with the exception of that assigned to the most significant one, are function of the value, 0 or 1, of some of the most significant digits and more precisely to one or several of the digits $a, b, c$.

The minimum analog voltage corresponding to a code, the most significant digit of which is 1 (logical condition $a$) is:

$$U3+U2+U1=V1\times(2^5+2^7+2^{10})$$

This may also be written:

$$U3+U2+U1=V1(2^5+2^7+2^{10})\times a$$

One will set:

$$Da=(2^5+2^7+2^{10})\times a \quad (11)$$

which means that, for the condition $a$, the corresponding analog voltage is $Da\times V1$ with $Da=2^5+2^7+2^{10}$; $Da$ represents thus the weight of the most significant digit when it is equal to 1.

By examining FIGURE 11, it is seen that a code having a digit $b$ equal to 1 (logical condition $b$) belongs to one of the groups $C'1, C''2$ or $C''3$.

If it belongs to the group $C'1$, one has the logical condition $\bar{a}\cap b$ and the corresponding minimum analog voltage is: $U2+U3=(2^7+2^{10})\times V1$.

If it belongs to the group C″2 or C″3, one has the logical condition $a \cap b$ and the corresponding minimum analog voltage is:

$$(U1+U2+U3)+U1=(2^5+2^7+2^{10})\times V1+2^5\times V1$$

The first term of this equation is already given by the Equation 11 so that the contribution brought by the condition $a \cap b$, is: $2^5 \times V1$. One has thus:

either $(2^7+2^{10}) \times V1$ for the condition $\overline{a} \cap b$;
or $2^5 \times V1$ for the condition $a \cap b$.

These two terms will be grouped as follows:

$$V1([a\times(2^5) \cup \overline{a}(2^7+2^{10})]\cap b)=Db\times V1 \quad (12)$$

This expression means that, when the value of the digit $b$ is 1, its weight is $2^5 \times V1$ if the value of the digit $a$ is 1 or $(2^7+2^{10}) \times V1$ if the value of digit $a$ is 0: $Db$ represents thus the weight of the digit $b$, this weight depending on the value of the digit $a$.

A code wherein the value of the digit $c$ is 1 (logical condition $c$) belongs to one of the groups C′2 (condition $\overline{a} \cap \overline{b} \cap c$), C′1 (condition $\overline{a} \cap b \cap c$), C″1 (condition $a \cap \overline{b} \cap c$) or C″3 (condition $a \cap b \cap c$). One sees that:

(1) for the condition $\overline{a} \cap \overline{b} \cap c$, no contribution is brought by the digits $a$ and $b$ and the minimum voltage is $U3=2^{10}\times V1$;

(2) for the condition $\overline{a} \cap b \cap c$, the minimum voltage is $U3+U2+(U1/2)$, the factor 1/2 of the last term being due to the fact that the condition $c$ appears only at the middle of the group C′3. Since a contribution $U3+U2$ is already brought for the condition $\overline{a} \cap b$, it remains: $(U1/2)=2^4 \times V1$;

(3) for the condition $a \cap \overline{b} \cap c$, the minimum voltage is $U3+U2+U1+(U1/2)$ and, since a contribution $U3+U2+U1$ is already brought for the condition $a$, it remains: $U1/2=2^4 \times V1$;

(4) for the condition $a \cap b \cap c$, the minimum voltage is $U3+U2+U1+U1+U2$. But the condition $a$ brings a contribution $U3+U2+U1$ and the condition $a \cap b$ brings a contribution $U1$. It remains $U2=2^7 \times V1$.

These four terms may be grouped as follows:

$$Dc \times V1 = V1 \times [\overline{a}\cap\overline{b}(2^{10})+\overline{a}\cap b(2^4) \\ +a\cap\overline{b}(2^4)+a\cap b(2^7)]\cap c \quad (13)$$

$Dc$ represents the weight of the digit $c$, this weight being a function of the value of the digits $a$ and $b$.

As it has been seen previously, the difference number made up by the digits $c$ to $g$ or $d$ to $g$, gives the code position in the group. The weight assigned to each one of these digits inside a given group is thus constant.

When the code is located in one of the groups C′1 or C″1, this corresponds to the logical condition $$D1=(\overline{a}\cap b)\cup(a\cap\overline{b})$$

and the value of the quantizing step is equal to $V1$. One has thus a contribution:

$$D1\times(2^3d+2^2e+2^1f+2^0g)\times V1 \quad (14-1)$$

It will be noticed that this expression representing the difference number does not contain the digit $c$, this resulting from the fact that the contribution of this digit has been taken into account during the establishment of the Equation 13.

When the code is located in one of the groups C′2 or C″2, one has:

$$D2=(\overline{a}\cap\overline{b}\cap c)\cup(a\cap b\cap\overline{c})$$

and a contribution:

$$D2\times(2^3d+2^2e+2^1f+2^0g)\times 2^3\times V1 \quad (14-2)$$

When the code is located in one of the groups C′3 or C″3, one has:

$$D3=(\overline{a}\cap\overline{b}\cap\overline{c})\cup(a\cap b\cap c)$$

and a contribution:

$$D3\times(2^3d+2^2e+2^1f+2^0g)\times 2^6\times V1 \quad (14-3)$$

The three Equations 14–1, 14–2, 14–3 may be combined together as follows:

$$Dx \times V1 = (D1\cup 2^3D2\cup 2^6D3) \\ \times(2^3d+2^2e+2^1f+2^0g)\times V1 \quad (14)$$

The sum of the four Equations 11, 12, 13, 14 is equal to the decoded voltage $ed$:

$$ed=(Da+Db+Dc+Dx)\times V1$$

and $$ed/V1=Da+Db+Dc+Dx \quad (15)$$

The right hand side terms of this Equation 15 combine and group together in a simple way, and one obtains, after having multiplied the whole expression by $2^{-10}$:

$$ed/(2^{10}V1)=(2^0+2^{-3}+2^{-5})\times a+(2^0+2^{-3})\times(\overline{a}\cap b)$$
$$+2^{-5}\times(a\cap b) \quad (16-1), (16-2), (16-3)$$
$$+D3\times(2^{-3}c+2^{-1}d+2^{-2}e+2^{-3}f+2^{-4}g) \quad (16-4)$$
$$+D2\times(2^0c+2^{-4}d+2^{-5}e+2^{-6}f+2^{-7}g) \quad (16-5)$$
$$+D1\times(2^{-6}c+2^{-7}d+2^{-8}e+2^{-9}f+2^{10}g) \quad (16-6)$$

Since this decoder comprises that described in FIGURE 9, constant current generators supplying the ladder attenuator of the FIGURES 4 to 6, the Equation 16 made up of the sum of the terms of Equations 16–1 to 16–6 is of the same form as the Equation 3 and one has:

$$2^{10}V1=2RI/3 \text{ hence } V1=2^{-9}(RI/3) \quad (18)$$

The maximum voltage delivered by the decoder is $Ed$ when all the digits of the code are equal to 1. This value is obtained easily, either by the Equation 16, or by writing:

$$Ed=2(U1+U2+U3)V1-2^6V1$$

or $$Ed=(2^8+2^{11})V1 \quad (19)$$

By combining the Equations 18 and 19, one obtains: $Ed=1.5RI$.

If the following values are taken for R and I: $R=500$ ohms and $I=10$ ma., one has:

$$Ed=1.5\times 0.5\times 10=7.5 \text{ volts} \quad (20)$$

$$V1=(2^{-9}\times 5)/3=1.67/512=3.25 \text{ mv.} \quad (21)$$

FIGURE 12 represents the detailed diagram of a nonlinear decoder established according to Equation 16.

It includes:

The block of registers 130;
The group of switching circuits 140;
The block of current generators 160;
The ladder attenuator 170.

A clock 120 has also been shown which delivers time slot signals referenced $t1$ to $t8$ which enable to carry out the decoding of a seven digit code received in series form on the conductor 11 connected to the block of registers 130. Each group of signals $t1$ to $t8$ defines a "frame period" and each one of the time intervals $t1$ to $t8$ will be called "digit time slot."

The digit time slots $t1$ to $t7$ are reserved respectively to various operations carried out in the registers.

Also each digit time slot is divided into four equal "basic time slots" $a, b, c, d$.

The block of registers 130 includes the following circuits:

The register 131 comprising the flip-flops 131a to 131g;
The register 132 comprising the flip-flops 132a to 132g;
The series-parallel converter 133 comprising the AND circuits 133a to 133g activated successively by the signals $t1$ to $t7$ so that, if the code is received with the most significant digit first, said digit is stored in the flip-flop 131a and so further;
The transfer circuit 134 comprising the AND circuits 134a to 134g and which enables the transfer, in the register 132, of the code written in the register 131 when it is activated at the time $t8b$, i.e., at the basic time slot $b$ of the digit time slot $t8$.

If one assumes that initially the two registers do not contain any code, the block 130 operates as follows:

During the times $t1$ to $t8$ of a first frame period PR1, a number arriving in series form on the conductor 11 is written in the seven flip-flops of the register 131. In $t8b$, the transfer circuit 134 is activated and this code is transferred into the register 132 and, in $t8c$, the register 131 is cleared. A new code arriving in PR2 may then be written in this register. The code written in the register 132 is cleared in $t8a$ of the frame period PR2 so that it is available during almost all the duration of a frame period.

The group of switching circuits 140 comprises three groups of five AND circuits referenced respectively 141, 142, 143. Each one of the AND circuits bears an additional reference letter characterizing the flip-flop of the register 132 to which is connected its first input terminal: thus, the first input terminal of the AND circuit 141$e$ is connected to the output terminal 1 of the flip-flop 132$e$.

The second input terminals of the groups 141, 142, 143 are respectively connected to the conductors 17, 18, 19. These conductors receive signals from the decoder 150, shown on the FIGURE 13, said signals characterizing respectively the conditions D3, D2 and D1 of the Equation 16.

The block of current generators 160 includes a certain number of generators of the type described in relation with FIGURES 7 and 8. Each one of these generators is referenced in the following way:

A letter: K;

A first digit characterizing the input point of the attenuator to which it is connected, and a second digit characterizing its order number in the group of generators connected to the same input: thus the generator K42 is the second generator connected to the input point P4 of the attenuator 170.

The ladder attenuator 170 comprises the resistors 171 to 182 of value R and the resistors 183 to 191 of value 2R. These resistors define eleven input points P0 to P10 and the attenuator introduces thus a maximum loss of $2^{10}$.

FIGURE 13 represents, by way of a nonlimitative example, a mode of achievement of the decoder 150 delivering signals characterizing the logical conditions $a \cap b$, $\bar{a} \cap b$, D1, D2 and D3 present in the Equation 16. This decoder includes the AND circuits 151 to 157 and the OR circuits 149, 158 and 159. It receives the input signals on the group of six conductors 20 which are connected to the outputs 0 and 1 of the flip-flops 132$a$, 132$b$, 132$c$. According to the conventions stated with reference to FIGURE 1, the conditions $a$ and $\bar{a}$, for instance, are obtained respectively on the output 1 and on the output 0 of the flip-flop 132$a$.

The logical condition $a \cap b$ corresponding to the Equation (16–3) is established by the AND circuit 151 which delivers a signal on its output 15 when the flip-flop 131$a$ is in the 1 state (condition $a$) whereas at the same time the flip-flop 131$b$ is in the 1 state (condition $b$).

The AND circuit 152 is activated for the logical condition $\bar{a} \cap b$ corresponding to the Equation 16–2 and delivers in this case a signal on its output 16. The AND circuits 153, 154 and the OR circuit 158 materialize the logical condition $D3 = (a \cap b \cap c) \cup (\bar{a} \cap \bar{b} \cap \bar{c})$ and a signal appears on the conductor 17 when this condition is fulfilled. Similarly:

A signal appears on the conductor 18 for the logical condition $D2 = (\bar{a} \cap b \cap c) \cup (a \cap b \cap \bar{c})$ materialized by the AND circuits 155, 156 and the OR circuit 159;

a signal appears on the conductor 19 for the logical condition $D1 = (\bar{a} \cap b) \cup (a \cap \bar{b})$ materialized by the AND circuits 152, 157 and the OR circuit 149.

If $Vs$ designates the voltage between the point P0 and ground, and $ed$ the analog voltage corresponding to the number written in the register 132, one has $Vs = VN + ed$, the voltage VN being one of the supply voltages of the current generators (see description of FIGURE 7).

It will be noticed that only one of the conditions D1, D2 or D3 may be present at a given moment.

Figure 14:
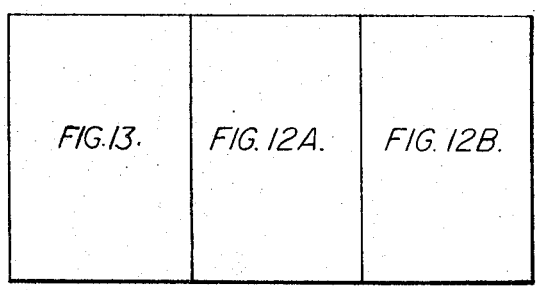
FIGURE 14 shows the assembly diagram of the FIGURES 12A, 12B and 13.

FIGURE 14 represents the assembly diagram of FIGURES 12A, 12B and 13.

The operation of this decoder which enables the physical realization of the Equation 16 will now be described in detail, the numerical coefficients expressed as negative powers of 2 being interpreted as in Equation 3.

The operation of the circuits assigned to the realization of the Equations 16–1 and 16–2, the current generators of which are grouped in the circuit 161, will be first described.

The Equation 16–1 means that, when the condition $a$ is fulfilled, a current I must be injected at each of the input points P0, P3 and P5 of the attenuator 170. Therefore, the activation inputs of the generators K01, K31 and K51 are connected to the output 1 of the flip-flop 132$a$.

The Equation 16–2 means that, when the condition $\bar{a} \cap b$ is fulfilled, a current I must be injected at the input points P0 and P3 of the attenuator 170. Since this condition is materialized by the presence of a signal on the conductor 16, the activation inputs of the generators K02 and K32 are connected to this conductor.

The operation of the circuits assigned to the realization of the Equations 16–3 to 16–6 will now be described, this operation being ruled by the same principles as those ruling the Equations 16–1 and 16–2. Thus, the generator K52, controlled by the presence of a signal on the conductor 15, materializes the Equation 16–3.

The terms between brackets of the Equation 16–4 are materialized by the generators K33, K11, K21, K34 and K41, the activation inputs of which are connected respectively to the outputs of the AND circuits 141$c$ to 141$g$ located in the group of switching circuits 140.

The first input of each one of these AND circuits is connected to the output of the flip-flops 132$c$ to 132$g$, so that it is activated only when the corresponding flip-flop is in the 1 state, this corresponding to the conditions set up in the term between brackets of this equation. The second inputs of these AND circuits are connected in parallel and linked to the conductor 17 on which appears the signal D3. The Equation 16–4, therefore, provides a contribution to the output voltage only when the condition D3 is present, the contribution being a function of those of the digits $c, d, e, f, g$ which are equal to 1.

The Equations 16–5 and 16–6 are realized in an identical way:

For the Equation 16–5, the generators referenced K03, K42, K53, K61 and K71 are controlled by the signals delivered by the AND circuits 142$c$ to 142$g$;

For the Equation 16–6, the generators referenced K62, K72, K8, K9 and K10 are controlled by the signals delivered by the AND circuits 143$c$ to 143$g$.

It will be noted that several current generators activated by two of the conditions D1, D2 or D3 are connected to certain input points of the attenuator. But, it has been seen, at the end of the study of FIGURE 13 that only one of these conditions may be present at a given time. Thus, the generators K71 and K72 associated to the point P7 are activated, the first one by the logical condition $D2 \cap g$, and the second one by the logical condition $D1 \cap d$. These generators may, thus, be replaced by one single generator activated by the logical condition $(D2 \cap g) \cup (D1 \cap d)$, by using an OR circuit the input terminals of which are connected to the output terminals of the AND circuits 142$g$ and 143$d$.

The decoder just described, comprises thus, for $n = 7$ digits, twenty-one current generators. It has been seen, during the study of FIGURE 6, that the ratio between the currents $I_2$ and $I_1$ which are the currents absorbed by a generator, respectively, when it is not activated and when it is activated, is $(I_2/I_1) \simeq 0.96$.

The limits between which the current absorbed by the generators varies will be set up by examining Equation 16. It is thus seen that there are:

(1) either nine generators activated and twelve generators blocked;
(2) or zero generator activated and twenty-one generators blocked.

The total consumption is thus:

In the first case:

$$9 \times I_1 + 12 \times I_2 = I_1(9 + 12 \times 0.96) = 20.52 \times I_1$$

In the second case:

$$21 \times I_2 = 21 \times 0.96 \times I_1 = 20.16 \times I_1$$

Thus, the current delivered by the voltage source $(VM-VN)$ varies at the maximum in the ratio $$(20.52/20.16) < 1.02$$

This variation is very small so that it is not necessary that said voltage source presents a very low internal impedance.

A nonlinear decoder, in which all the current generators deliver the same current I, has just described in relation with FIGURES 12 and 13. The same result may be obtained by shifting the injection point of any one of the generators by a certain number $r$ of input points towards the input points which bear decreasing indices and by reducing the current I to a value $I' = I \times 2^{-r}$.

It has been seen, in the study of FIGURE 7, that the described current generator delivered a current which is reciprocal to the value of the emitter resistor 121, provided the gain $h_{fe}$ of the transistor T1 should be sufficiently high. In order to obtain a current $I' = 2^{-r}I$, it is thus sufficient to give to the resistor 121 a value $2^r \times R'$.

Thus, referring to the circuit 161' of FIGURE 12, the three generators K01, K31 and K51 which are activated for the logical condition $a$, may be replaced by a single generator which delivers a current $I(1+2^{-3}+2^{-5})$ injected at the point P0 of the attenuator. Similarly, the generators K02 and K32 which are activated for the logical condition $\bar{a} \cap b$ can be replaced by a single generator delivering a current $I(1+2^{-3})$ injected at point P1.

Figure 15:
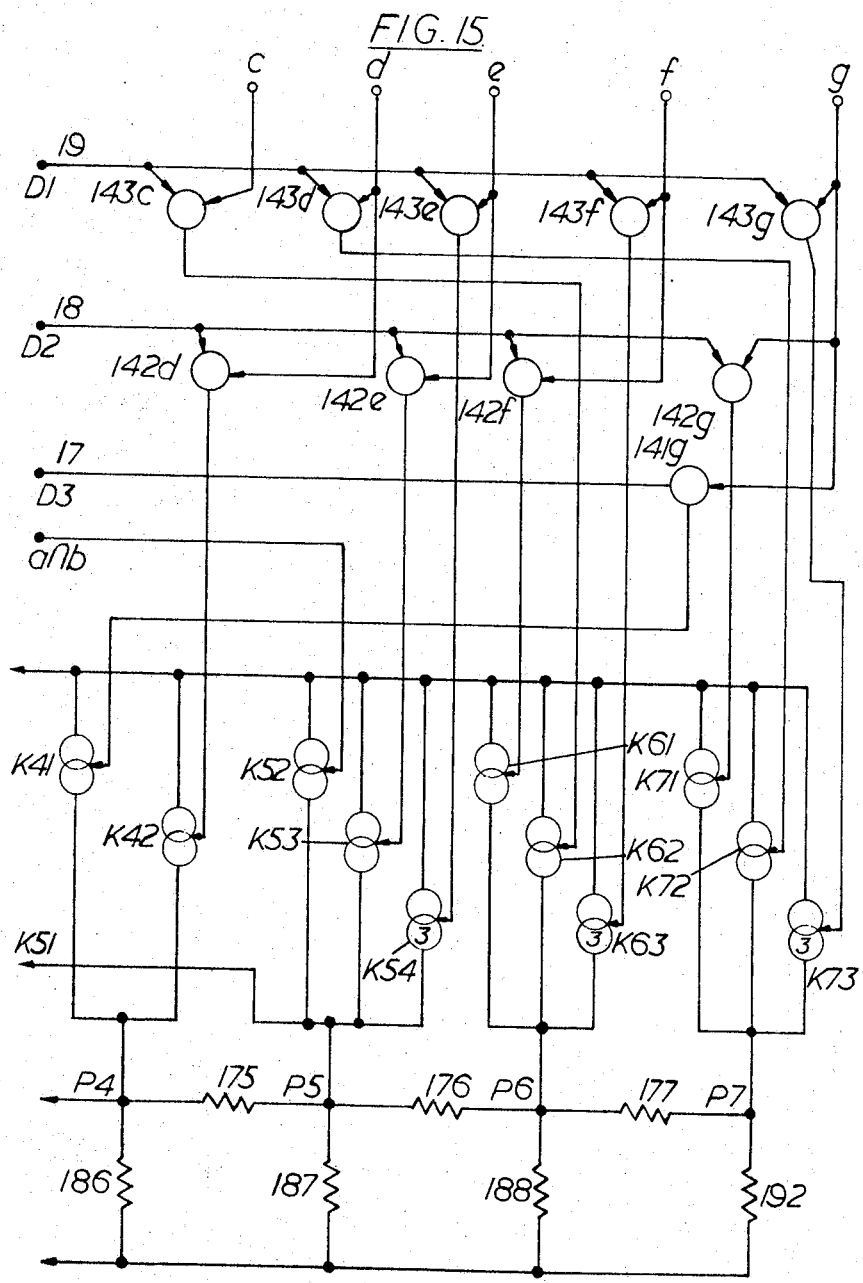
FIGURE 15 shows a first alternative solution of nonlinear decoder.

On the other hand, the part of the circuits 160 and 170 of FIGURE 12 concerning the input points P4, P5, P6 and P7 of the attenuator have been shown on FIGURE 15. Point P7 now constitutes the last input point, so that the resistor 192 has a value R. The generators K8, K9 and K10 located in the circuit 162 of the block of generators 160 (FIGURE 12) are thus eliminated.

By way of a nonlimitative example, they have been replaced, in FIGURE 15, respectively by the generators K54, K63, K73 which correspond, for each one of the considered generators, to a shift in which $r=3$. The current delivered by each one of these generators is thus equal to $I' = 2^{-3}I$.

On the figure, these generators have been identified by the numeral 3 (corresponding to the value chosen for $r$) located in the lower circle of the symbol.

The mode of producing the analog voltages corresponding to codes belonging to the groups C'3, C'2, C'1 and C''1 will now be determined for the decoder described in relation with FIGURES 12 and 13 and the characteristic curve of which is shown on FIGURE 11, in order to study how the analog voltages vary when one shifts from the maximum code of one group to the minimum code of the following group when the codes increase.

As before, the extreme codes of one group will be referenced by the index "min" for the code the decimal equivalent of which is the lowest and by the index "max" for the code the decimal equivalent of which is the highest.

These extreme codes have been shown on Table II together with the corresponding decoded voltages which are calculated by means of Equation 16. In this table, when two terms which are negative powers of 2 are separated by a dotted line, this means that all intermediary terms are present.

Thus $(e'3)\max = 2^{10}V1(2^{-1} + \ldots + 2^{-4})$ means:

$$(e'3)\max = 2^{10}V1(2^{-1} + 2^{-2} + 2^{-3} + 2^{-4})$$

The last right hand side column gives the calculated values of these voltages as a function of the unit quantizing step V1.

If the passage from the group C'3 to the group C'2 is considered, it is seen that:

The voltage $(e'3)\max$ is supplied by the simultaneous activation of four generators connected respectively to the input points P1, P2, P3 and P4 of attenuator 170 (FIGURE 12);

TABLE II

| Group | Code | Digits | | | | | | | Algebraic expression of the corresponding analog voltages | Computed values |
|---|---|---|---|---|---|---|---|---|---|---|
| | | a | b | c | d | e | f | g | | |
| C'3 | (C'3) min | 0 | 0 | 0 | 0 | 0 | 0 | 0 | (e'3) min = 0 | 960 V1 |
| | (C'3) max | 0 | 0 | 0 | 1 | 1 | 1 | 1 | (e'3) max = 2^10 V1 (2^-1 + ... +2^-4) | 1,024 V1 |
| C'2 | (C'2) min | 0 | 0 | 1 | 0 | 0 | 0 | 0 | (e'2) min = 2^10 V1 (2^0) = V16.1 | 1,144 V1 |
| | (C'2) max | 0 | 0 | 1 | 1 | 1 | 1 | 1 | (e'2) max = 2^10 V1 (2^0 + 2^-4 + ... +2^-7) | 1,152 V1 |
| C'1 | (C'1) min | 0 | 1 | 0 | 0 | 0 | 0 | 0 | (e'1) min = 2^10 V1 (2^0 + 2^-3) = V32.1 | 1,183 V1 |
| | (C'1) max | 0 | 1 | 1 | 1 | 1 | 1 | 1 | (e'1) max = 2^10 V1 (2^0 + 2^-3 + 2^-0 + ... +2^-10) | 1,184 V1 |
| C''1 | (C''1) min | 1 | 0 | 0 | 0 | 0 | 0 | 0 | (e''1) min = 2^10 V1 (2^0 + 2^-3 + 2^-5) = V64 | 1,215 V1 |
| | (C''1) max | 1 | 0 | 1 | 1 | 1 | 1 | 1 | (e''1) max = 2^10 V1 (2^0 + 2^-3 + 2^-5 + ... +2^-10) | |

The voltage $(e'2)\min$ is supplied by the activation of one single generator connected to the input point P0 of the attenuator (generator K03, FIGURE 12).

Besides, if the production of the voltages in the group C'2 which is characterized by the logical condition $(\bar{a} \cap \bar{b} \cap c)$ and by the Equation 16-5 is now considered, it is seen that this generator K03 is permanently activated for all the codes of the group, since for all of them, the digit of rank $c$ is 1.

One may, thus, consider that when one shifts from the code (C'3)max to the code (C'2)min, four generators are replaced by one single generator delivering a voltage $V16.1 = (e'2)\min = U3 = 1024 V1$.

It is also observed that, in the group C'1, the generators K02 and K32 connected, respectively, to the input points P0 and P3 are activated simultaneously for all the codes of this group. All the generators activated for the code (C'2)max are blocked and replaced by these two generators delivering a voltage $$V32.1 = (e'1)\min = U2 + U3 = 1152 V1$$

It will be noticed that, in these two groups C'2 and C'1, the current injected at the point P0 is supplied by different generators. The voltages V16.1 and V32.1 are thus produced separately.

Last, in the group C''1, the generators K01, K31, K51 connected respectively to the input points P0, P3, P5 are activated simultaneously for all the codes of this group. All the generators activated for the codes of the group (C'1)max are blocked and replaced by three generators delivering a voltage $$V64 = (e'1)\min = U1 + U2 + U3 = 1184V1$$

It will be noticed that, in these two groups C'1 and C''1, the currents injected at the points P0 and P3 are supplied by different generators. The voltages V32.1 and V64 are thus produced separately.

To sum up, it may be said that the decoded voltage corresponding to a code belonging to the groups C'2, C'1, C''1, is made up of the sum of a fixed voltage V16.1, V32.1, or V64 determined in accordance with the group and of a variable voltage depending upon the position of the code in the group and that the generators which produce each one of said fixed voltages are different.

These fixed voltages are supplied with a certain tolerance with respect to their rated value shown on the right hand column of Table II.

It will be admitted for instance, for each one of these voltages a tolerance of $\pm 1\%$. Therefore, one will have, in particular:

$$(e'1)\max = (1183 \pm 12)V1$$
$$(e''1)\min = (1184 \pm 12)V1$$

As it has been seen previously, these two voltages are obtained with two different generators so that they may differ by 24V1, whereas they should only differ theoretically by V1. There is, therefore, a maximum error of amplitude $\Delta ro = 23V1$.

Figure 16:
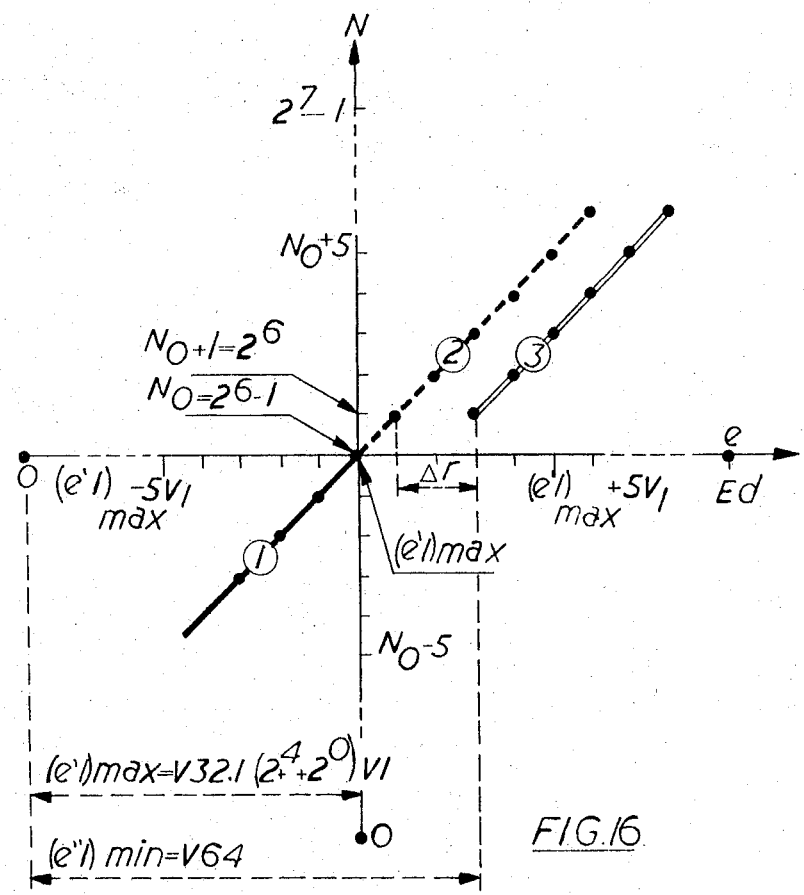
FIGURE 16 shows the discontinuity of the decoding characteristic curve in the neighborhood of its center.

FIGURE 16, which represents the decoding characteristic for the codes close to the codes $No = (C'1)\max$ and $No+1 = (C''1)\min$, shows a discontinuity in said characteristic due to this error.

The full straight line 1 represents the characteristic for the codes equal to/or lower than $No$. The dashed line 2 represents the ideal characteristic for the codes higher than $No$. Last, the characteristic 3, traced in double line, represents the real characteristic for a particular example in which $\Delta r = 2V1$ and which reduces itself to the characteristic 2 by a translation of amplitude $\Delta r$.

If the codes treated in the considered decoder represent voice signals, this region of the characteristic corresponds to codes which are transmitted when the mean level of said signal is practically zero. In the case where this level is zero, the codes transmitted are the codes $$No = 2^6 - 1 \text{ and } No+1 = 2^6$$

if one considers, in order to simplify the description, that the instantaneous amplitude of the noise during the decoding is lower than $\pm V1$.

It is thus seen, on FIGURE 16, that the analog voltages corresponding to the codes $No$ and $No+1$ differ by V1 for the ideal curve (lines 1 and 2) and by 3V1 for the displaced curve (lines 1 and 3).

More generally, these voltages differ by $(\Delta r + V1)$.

If one considers a sinusoidal signal, the decoded mean value of which should be equal to $(e'1)\max$, it is seen that the same would happen when decoding all the codes belonging to the groups C'1 and C''1.

Thus, if two numbers represent the peak value, respectively of a negative alternation and of a positive alternation of a sinusoidal signal, the decoding voltage corresponding to the negative alternation is, for instance, $(e'1)\max - 5V1$, the voltage corresponding to the positive alternation being then $(e'1)\max + 7V1$.

This discontinuity of the decoding characteristic near the codes corresponding to the mean level of the signal, initiates a dissymmetrical recovery of the two alternations of a sinusoidal signal. The resulting distortion is more appreciable as the level of the said sinusoidal signal is lower.

In the case of this example, the peak to peak amplitude of the decoded signal is 12V1 instead of being 10V1. There is, therefore, an amplification of the signal which is particularly disturbing owing to the fact that the voice level is zero, since it concerns a noise amplification.

Last, the average level of this signal is $(e'1)\max(\Delta r/2)$ whereas it should be $(e'1)\max$: there is, therefore, a modification of the mean level of the signal.

In order to reduce this error $\Delta r$, the voltage $(e''1)\min$ will be obtained by the addition of the voltage V32.1, used for the decoding of the numbers of the group C'1, with a voltage V32.2.

The amplitude of this voltage should be:

$$V32.2 = V64 - V32.1 = 32V1 \tag{22}$$

In these conditions, the discontinuity between the points $No$ and $No+1$ of FIGURE 16 will be reduced to $\pm 0.3V1$ which is acceptable.

The Equations 16–1 and 16–2 give the voltages V64 and V32.1:

$$V64 = 2^{10}V1(2^0 + 2^{-3} + 2^{-5})a \tag{16-1}$$

$$V32.1 = 2^{10}V1(2^0 + 2^{-3})(\overline{a} \cap b) \tag{16-2}$$

Since the sum of the voltages V32.1 and V32.2 must replace the voltage V64 for the decoding of the codes belonging to the groups C''1, C''2, C''3, these two voltages must be present for the condition $a$. The logical factor of the Equation 16–2 becomes then $(\overline{a} \cap b) \cup a = a \cup b$, and one has:

$$V32.1 = 2^{10}V1(2^0 + 2^{-3})(a \cup b) \tag{23-1}$$

On the other hand, one has, according to Equation 22:

$$V32.2 = 2^{10}V1(2^{-5})a \tag{23-2}$$

These Equations 23–1 and 23–2 replace the Equations 16–1 and 16–2. The Equations 16–3 to 16–6 are not modified and will be referenced as Equations 23–3 to 23–6.

The shiftings of groups are carried out in the following way:

(a) Shifting from c'3 to C'2: the voltage $(e'3)\max$—see Table I—is replaced by the voltage V16.1;
(b) Shifting from C'2 to C'1: the voltage $(e'2)\max$ is replaced by the voltage V32.1;
(c) Shifting from C'1 to C''1: the voltage $(e'1)\max$ is replaced by the voltage $V32.1 + V32.2$.

The angular points of the decoding characteristic of FIGURE 11 being also distortions.

Thus, for the shifting from the group C'2 to the group C'1, one has:

$$(e'2)\max = (1144 \pm 11.5)V1$$
$$(e'1)\min = (1152 \pm 11.5)V1$$

These two voltages may differ at most by 31V1, whereas they should differ theoretically by 8V1. The maximum error is $\Delta r = 23V1$.

One has, therefore, a distortion of the signal and an alteration of the mean level which present little importance since the considered levels are largely higher than that of the noise.

It will be noticed that, if it is desired to reduce the error, it may be possible, as in the case studied previously, to replace the voltage V32.1 by the sum of the voltage V16.1 and the voltage V16.2 for amplitude U2.

FIGURE 17 represents a part of the circuits of the decoder operating according to this principle.

One has shown on this figure:

The part of the attenuator 170 comprising the input points P0 to P5;
The part of the block of generators comprising the generators connected to these same input points. This block has been referenced 160'' and the generators which supply the voltages corresponding to the Equations 23–1, 23–2, 23–3 are grouped in the circuit 161''.

All the generators of the block 160'' other than those grouped in 161'' are identical to those of the block 160, FIGURE 12, and are connected to the same points of the attenuator;

The flip-flops 132a and 132b of the block of registers 130;

The AND circuit 151 and the OR circuit 147 belonging to the block 150 (FIGURE 13) and which deliver, respectively, the logical conditions $a \cap b$ (output 15) and $a \cup b$ (output 21).

The Equations 23-1, 23-2, and 23-3 are realized by the following generators each one delivering a current I:

The Equation 23-1 by the generator L52, the output of which is connected to the point P5 and which is activated when the flip-flop 132a is in the 1 state;

The Equation 23-2 by the generator L51, the output of which is connected to the point P5 and which is activated by a signal on output 15;

The Equation 23-3 by the generators L01 and L31, the outputs of which are, respectively, connected to the points P0 and P3 and which are activated by a signal on output 21. This equation may also be materialized by one single generator connected to the point P0 and delivering a current of amplitude $I(1+2^{-3})$.

The various alternative solutions of nonlinear decoders which have just been described may be used directly for achieving a nonlinear feedback coder, the elements of which are grouped as described in the book referenced (b).

While the principles of the above invention have been described in connection with specific embodiments and particular modifications thereof, it is to be clearly understood that this description is made by way of example and not as a limitation of the scope of the invention.

What we claim is:

1. A nonlinear decoder, having a nonlinear characteristic including a plurality of straight line segments each having a different slope, for $n$ digit code groups comprising $n$ bistable means to store the $n$ digits of a code group; decoder means coupled to selected ones of said bistable means to produce a first plurality of control signals; a first plurality of current generators coupled to said decoder means and one of said selected ones of said bistable means responsive to the condition of selected ones of said first control signals and the condition of the digit stored in said one of said selected ones of said bistable means to activate the generation of current by said first generators; logical switching means coupled to the remainder of said bistable means and said decoder means responsive to the condition of the digits stored in said remainder of said bistable means and the condition of the remainder of said first control signals to produce a second plurality of control signals; a second plurality of current generators coupled to said switching means responsive to said second control signals to activate the generation of current thereby; and summing means coupled to said first and second plurality of current generators to add the amplitudes of the output of the activated ones of said first and second current generators to produce an analog voltage representing the decoded value of the code group stored in said bistable means.

2. A decoder according to claim 1, wherein said remainder of said control signals number three; said logical switching means includes
a first group of AND gates coupled to said remainder of said bistable means and an output of said decoder means carrying the first of said remainder of said first control signals,
a second group of AND gates coupled to said remainder of said bistable means and an output of said decoder means carrying the second of said remainder of said first control signals, and
at least one AND gate coupled to said remainder of said bistable means and an output of said decoder means carrying the third of said remainder of said first control signals; and
said second plurality of current generator includes at least one current generator coupled to the output of each of said AND gates.

3. A decoder according to claim 1, wherein said remainder of said control signals number three; said logical switching means includes
a first group of AND gates coupled to said remainder of said bistable means and an output of said decoder means carrying the first of said remainder of said first control signals,
a second group of AND gates coupled to said remainder of said bistable means and an output of said decoder means carrying the second of said remainder of said first control signals, and
a third group of AND gates coupled to said remainder of said bistable means and an output of said decoder means carrying the third of said remainder of said first control signals; and
said second plurality of current generators includes at least one current generator coupled to the output of each of said AND gates.

4. A decoder according to claim 1, wherein said summing means includes a ladder attenuator having a plurality of inputs therealong coupled in a predetermined manner to said first and second plurality of current generators to provide said analog voltage.

5. A decoder according to claim 1, wherein said first control signals identify which of said straight line segments is represented by said code groups.

6. A decoder according to claim 5, wherein the condition of the digits stored in said remainder of said bistable means indicates the amplitude position of said code group along said straight line segments identified by said first control signals.

7. A decoder according to claim 1, wherein said selected ones of said bistable means are said bistable means storing the $x$ largest weight digits of said code group, where $x$ is less than $n$.

8. A decoder according to claim 7, wherein said one of said selected ones of said bistable means is said bistable means storing the largest weight digit of said $x$ largest weight digits.

9. A decoder according to claim 7, wherein $n$ is equal to seven and $x$ is equal to three.

References Cited by the Examiner
UNITED STATES PATENTS
3,184,734   5/1965   Uren et al. _____ 340—347

MAYNARD R. WILBUR, *Primary Examiner.*

A. L. NEWMAN, *Assistant Examiner.*